United States Patent [19]

Harrigan

[11] Patent Number: 5,499,403
[45] Date of Patent: Mar. 19, 1996

[54] DISPOSABLE POCKET FOR ANIMAL TREATS

[76] Inventor: Lora Harrigan, 14 Peck St., Stratford, Conn. 06497

[21] Appl. No.: 250,022

[22] Filed: May 27, 1994

[51] Int. Cl.$^6$ .................................................. A41D 27/20
[52] U.S. Cl. ........................................... 2/247; 2/249
[58] Field of Search .............................. 2/247, 249, 250; 119/65; 383/43, 11; 150/150

[56] References Cited

U.S. PATENT DOCUMENTS

| | | | |
|---|---|---|---|
| 3,840,901 | 10/1974 | Eyster | 2/247 |
| 4,266,300 | 5/1981 | Partridge | 2/247 |
| 4,365,355 | 12/1982 | Off et al. | 2/247 |
| 4,389,801 | 6/1983 | Sharrock et al. | 2/247 |

Primary Examiner—C. D. Crowder
Assistant Examiner—Gloria Hale
Attorney, Agent, or Firm—Patrick J. Walsh

[57] ABSTRACT

A disposable pocket for temporary attachment to a person's outer garment and for receiving and holding an animal treat. The pocket is constructed such that there are front and back panels joined to each other along a leakproof seam to form a pocket and wherein a top panel is attached along its front and back edges to the upper margins of the front and back panels. The pocket is constructed of greaseproof material and there is a slot in the top panel. The rear panel has a pressure sensitive adhesive thereon to attach the pocket to a garment as desired. The front panel may be textured to give the appearance of fabric.

7 Claims, 4 Drawing Sheets 5,499,403

DISPOSABLE POCKET FOR ANIMAL TREATS

BACKGROUND OF THE INVENTION

The present invention relates to stick-on, disposable pockets for dog bait which may be referred to by the designation Cookie Patch.

Animal handlers normally reward their pets with a tidbit or treat (bait) after a successful performance. The reward is normally given immediately after the performance is completed. There is need for a suitable carrier for the tidbit so that it can be dispensed immediately whereever the performance occurs such as in class, in the field, or in the show ring.

SUMMARY OF THE INVENTION

The present invention comprises a disposable, stick on, greaseproof, slotted pocket for dogbait. The pocket is applied to the user's outer garment in an accessible location such as the chest or hip area on a garment with no existing pockets, thereby rendering that garment useful for training or show, or over an existing pocket to prevent soiling of the garment. For example, clothing such as T-shirts and stretch pants are very comfortable for dog class but they have no pockets, and dresses are often preferred for show but again lack pockets for holding bait. In accordance with invention, a disposable pocket containing bait is located as desired on the garment of choice. In the chosen location, the trainer conveniently and discreetly removes a treat from the pocket with a simple unobtrusive movement of the hand.

In a preferred form, the pocket is formed of front, back and top panels of sheet material sealed on marginal side, bottom, and top edges to form a pocket. The top panel includes a slot for access to the pocket interior. The rear face of the back panel is coated with an adhesive, and the adhesive is protected by a peel-off backing which is removed just prior to use. The front face of the front panel is textured or printed to resemble a fabric such as the sport coat, blazer or dress fabric worn by the trainer. If desired a real fabric facing may be applied to the front face of the pocket.

After a single use, the pocket is removed, used for carrying home any unused bait, emptied, and then discarded.

OBJECTS OF THE INVENTION

It is an object of the invention to provide a disposable pocket for use by animal handlers or others desiring to reward an animal for good conduct, performance of a trick, or for satisfactory progress in a training course.

It is an object of the invention to provide a disposable pocket applied to an outer garment.

It is a further object of the invention to facilitate the use of pocketless garments by animal handlers for class, field, or show.

It is a further object of the invention to provide a disposable pocket applied to an outer garment where the pocket is decorated to match the appearance of the outer garment.

It is a further object of the invention to provide a disposable pocket applied to an outer garment where the pocket is decorated to match the appearance of the outer garment as by texturing, printing, or fabric lining the front face of the pocket.

It is a further object of the invention to provide a disposable pocket which is greaseproof and leakproof to avoid staining the garment to which it is applied.

It is a further object of the invention to provide a carry home pouch for unused bait.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which.

DETAILED DESCRIPTION OF THE INVENTION

Figure 1:
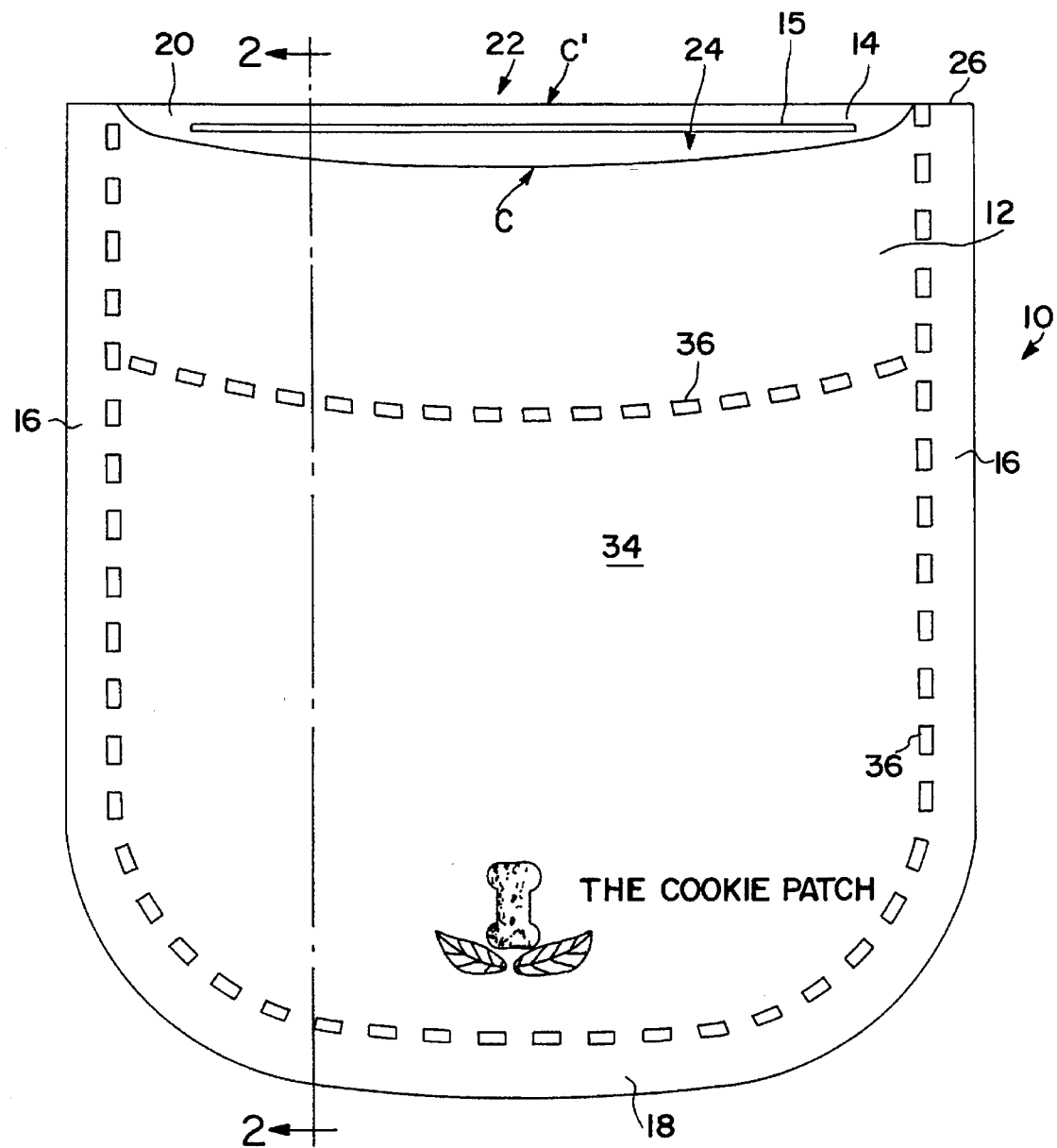
FIG. 1 is a front view of a disposable pocket according to the invention.
Figure 2:
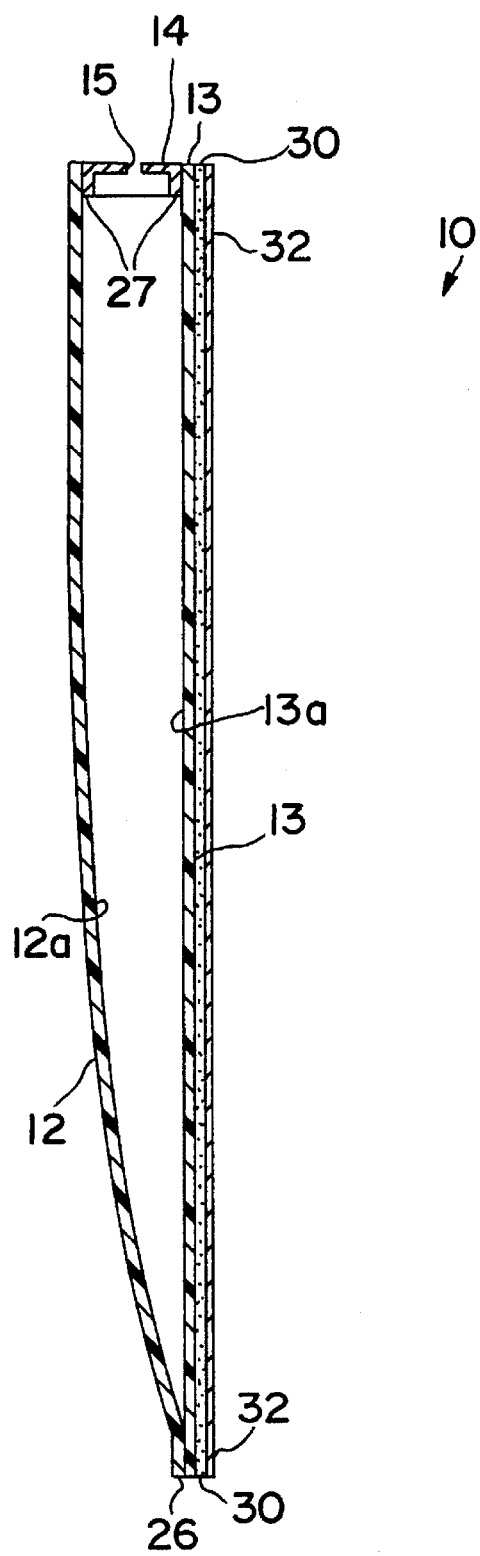
FIG. 2 is a section view taken along line 2—2 of FIG. 1.
Figure 3:
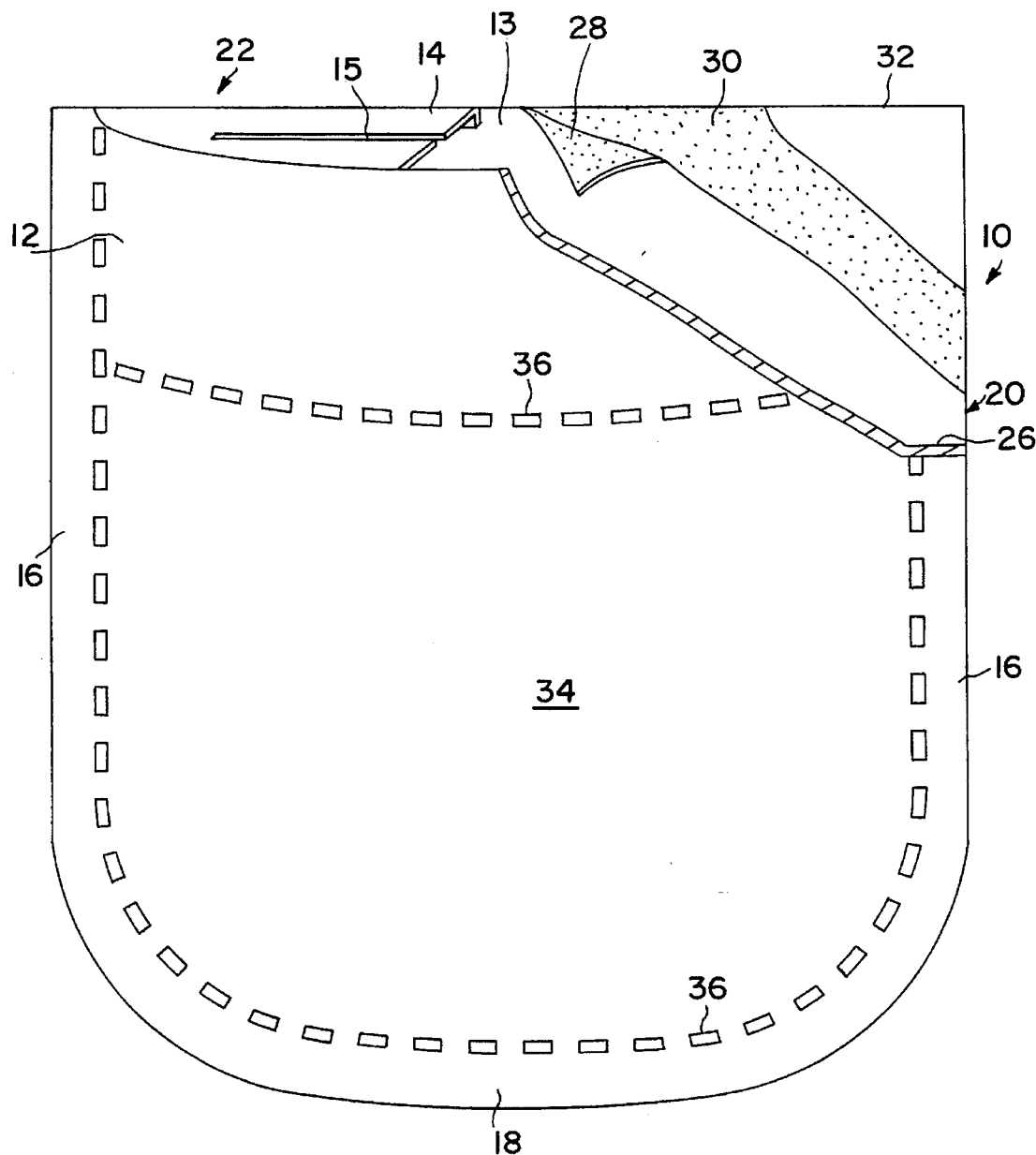
FIG. 3 is a front view of a disposable pocket according to the invention with layers partially torn away to for illustration and description.
Figure 4:
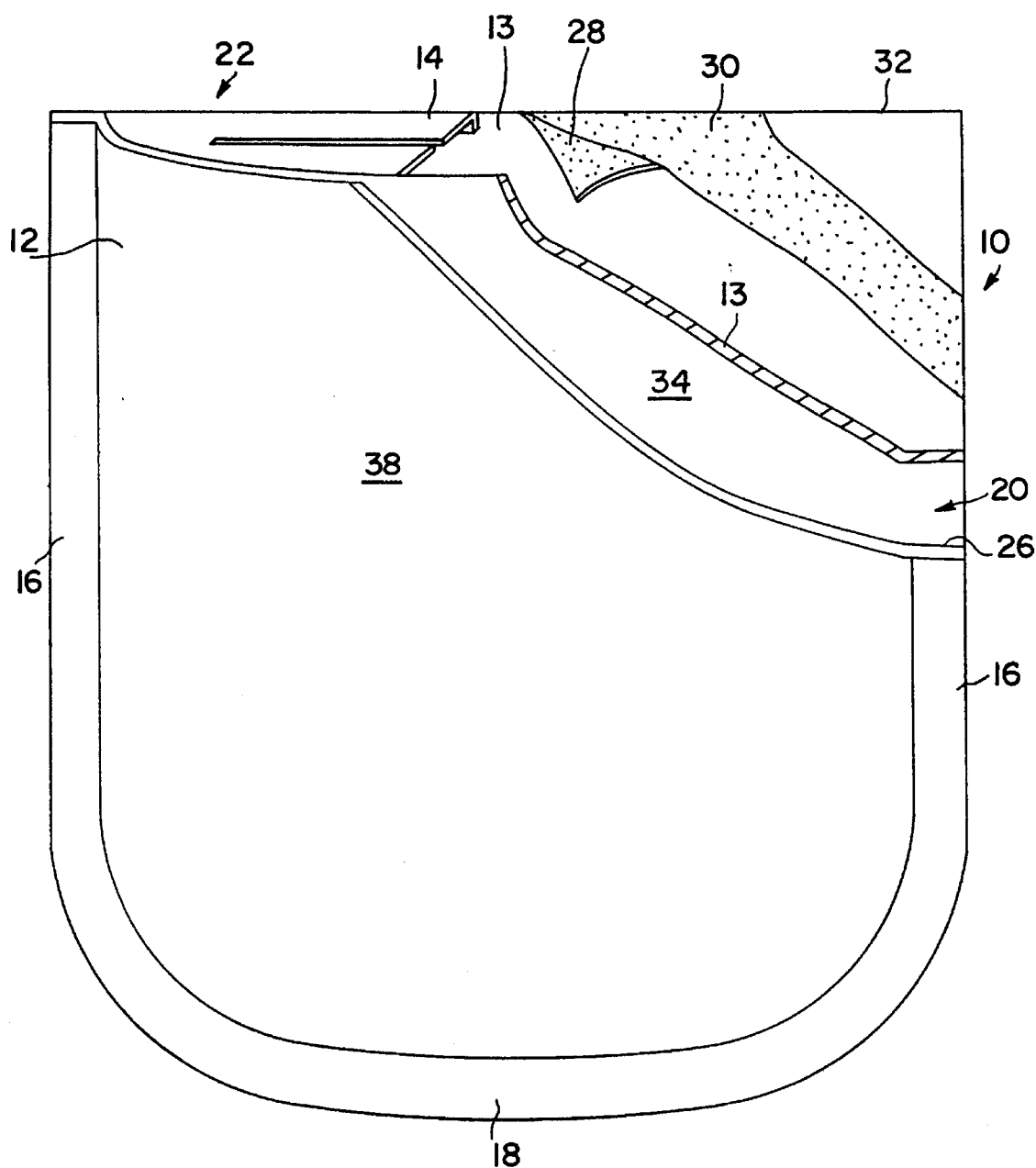
FIG. 4 is a front view of a modified disposable pocket according to the invention with layers partially torn away to for illustration and description including an outer fabric layer.

Referring now to the drawing, the disposable pocket 10 comprises front 12, back 13, and top 14 panels fabricated of suitable sheet material such as a flexible plastic which is greaseproof, i.e., impermeable to grease or any other coating or liquid exuding from a food treat of the kind usually given to animals by a trainer. The top panel 14 has a slot 15 extending from side-to-side across the top of the pocket. The side 16 and lower 18 edges of the front and back panels are sealed together as by heat sealing to define the pocket 20. The top end 22 of the pocket is enclosed by the slotted top panel 14 which functions to prevent bait from falling out of the pocket should the user bend forward during a performance. The top panel includes a depending skirt which is secured to the inner surfaces 12a and 13a of the front and back panels respectively. Preferably, the front and back panels are assembled so the back panel 13 is flat or planar, and the front panel 12 is bowed or curves outwardly around the top panel 13 from the sealed side edges 16 to a center point C suitably spaced from the back panel to add volume to the pocket interior 24 and to provide free, unrestricted access of the trainer's hand through the slot 15 to the interior. It is to be noted that continuous, leakproof seals 26 about the perimeter of the pocket and 27 (FIG. 2) about the interface of top panel and front and back panels are desired to avoid any leakage from the pocket interior to the surface of the supporting outer garment. In a preferred embodiment, the pocket is 5 inches wide from side to side, 5½ inches long from top to bottom, and with the top panel approximately ¾ inch between the center points C–C' of the front and back panels.

The outer surface 28 of the back panel is coated with a pressure sensitive adhesive 30 for sticking the pocket onto an outer garment such as a coat worn by the user. Preferably, a low tack pressure sensitive adhesive is employed for adhering to a coat fabric without removing the fabric nap when the pocket is detached after use. A peel-off backing covers 32 and protects the adhesive coating before using the pocket.

The front or facing surface 34. of the front panel is decorated to appear as being a part of the garment to which it is attached and may include printed or molded stitching 36 to simulate a tailored appearance, and if desired, an identifying logo L. In addition, the front face is given a fabric appearance as by being textured or printed during formation of the front panel. Texturing may be accomplished by any suitable technique such as stamping or molding to give the front face of the panel the appearance of a woven fabric. Printing may be used to give the front face of the pocket a coloration and woven appearance of plaid or other fabrics commonly used for outer garments. If desired for a deluxe version of the invention, the facing surface of the front panel may be covered with a fabric 38 matching an outer garment such as navy blazers, scotch plaids, madras and so forth.

In use, a trainer selects a pocket having a decorated front face to match the trainer's clothing, removes the peel-off cover and sticks the pocket onto a convenient part of the outfit such as the chest or side pocket area, and fills the pocket with an animal treat. After use the pocket is peeled off the trainer's clothing, used as a pouch to carry and save any unused portion of bait, emptied, and discarded.

I claim:

1. A disposable pocket for temporary attachment to a person's outer garment and for receiving and holding an animal treat comprising front and back panels joined to each other along side and bottom edges in a leakproof seam to form a pocket, the joined front and back panels having upper margins defining a top end of the pocket, a top panel having a slot therein, the top panel having front and back edges secured respectively to the upper margins of the front and back panels to enclose the pocket and provide access to the pocket through the slot, the front, back, and top panels being formed of greaseproof material, the back panel having an outer face and the front panel having a front face, the outer face of the back panel having a pressure sensitive adhesive thereon and a peel-off backing attached to the adhesive for protecting the adhesive prior to use, and the front face of the front panel being textured to have the appearance of a fabric.

2. A disposable pocket as defined in claim 1 in which the textured front panel matches the person's outer garment.

3. A disposable pocket for temporary attachment to a person's outer garment and for receiving and holding an animal treat comprising front and back panels joined to each other along side and bottom edges in a leakproof seam to form a pocket, the front and back panels being formed of greaseproof material, the joined front and back panels having upper margins defining a top end of the pocket, a slotted top panel, the top panel having front and back edges secured respectively to the upper margins of the front and back panels to enlarge the volume of the pocket and to enclose the pocket with the slot restricting access to the pocket, the back panel having an outer face and the front panel having a front face, the outer face of the back panel having a pressure sensitive adhesive thereon and a peel-off backing attached to the adhesive for protecting the adhesive prior to use, and the front face of the front panel being printed to have the appearance of a fabric.

4. A disposable pocket as defined in claim 3 in which the printed front panel matches the person's outer garment.

5. A disposable pocket for temporary attachment to a person's outer garment and for receiving and holding an animal treat comprising front and back panels joined to each other along side and bottom edges in a leakproof seam to form a pocket, a top panel having front and back edges secured respectively to the upper margins of the front and back panels, a slot in the top panel to provide access to the pocket interior, the front, back and top panels being formed of greaseproof material, the back panel having an outer face and the front panel having a front face, the outer face of the back panel having a pressure sensitive adhesive thereon and a peel-off backing attached to the adhesive for protecting the adhesive prior to use, and the front face of the front panel being lined with a fabric.

6. A disposable pocket as defined in claim 5 in which the fabric matches the person's outer garment.

7. A disposable pocket as defined in claim 1 in which the textured front panel includes simulated stitching.

* * * * *